April 20, 1954 W. H. D. HINCHMAN 2,675,627
SURVEYING APPARATUS
Filed Aug. 28, 1951 3 Sheets-Sheet 1

CONTROL BOX

PLUMB BOB

INVENTOR.
William H. D. Hinchman
BY
Barnes, Kisselle, Laughlin + Raisch
ATTORNEYS.

April 20, 1954 W. H. D. HINCHMAN 2,675,627
SURVEYING APPARATUS
Filed Aug. 28, 1951 3 Sheets-Sheet 2

INVENTOR.
William H. D. Hinchman
BY
Barnes, Kisselle, Laughlin & Raisch
ATTORNEYS.

April 20, 1954 W. H. D. HINCHMAN 2,675,627
SURVEYING APPARATUS
Filed Aug. 28, 1951 3 Sheets-Sheet 3

INVENTOR.
William H. D. Hinchman
BY
Barnes, Kisselle, Laughlin & Raisch
ATTORNEYS.

Patented Apr. 20, 1954

2,675,627

UNITED STATES PATENT OFFICE 2,675,627

SURVEYING APPARATUS

William H. D. Hinchman, Detroit, Mich.

Application August 28, 1951, Serial No. 244,077

3 Claims. (Cl. 33—205)

This invention relates to surveying apparatus and more particularly to an apparatus for surveying hollow piling, that is, for determining the drift of the piling from the vertical at various depths along the piling.

It is the object of this invention to produce a relatively simple device by which the angular deflection and displacement of hollow piling from the vertical can be determined quickly and accurately.

More specifically, the invention contemplates a plumb-bob in which is mounted a freely swinging pendulum. The pendulum is arranged within the plumb-bob such that, when the plumb-bob is inclined at an angle to the vertical, the pendulum swings under the influence of gravity through the angle of inclination of the plumb-bob in order to maintain its vertical position. The apparatus also contemplates a servo-mechanism which connects the pendulum with an indicator on a remotely positioned control box so that the deflection of the pendulum and the displacement of the piling from the vertical can be ascertained by readings on the indicator as the plumb-bob is lowered into the piling.

Figure 1:
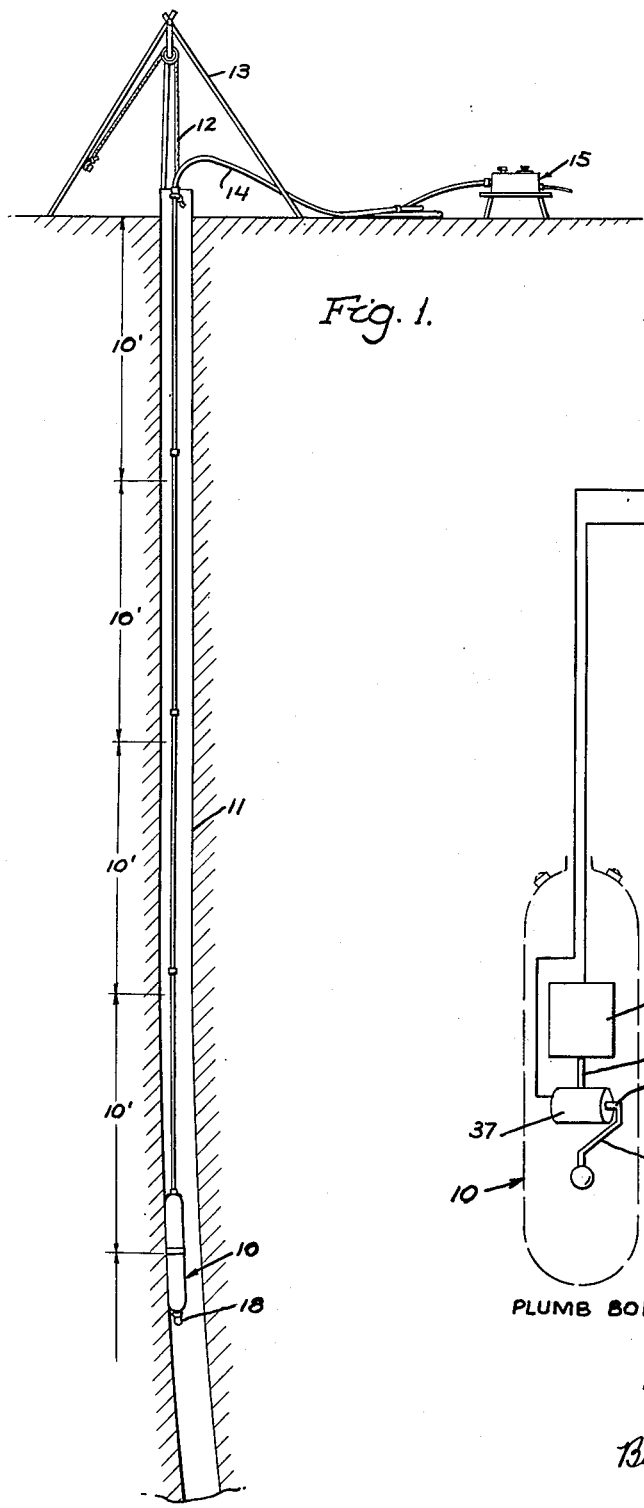
Fig. 1 is a vertical sectional view through a length of driven hollow piling showing the manner in which the apparatus of this invention is used.
Figure 2:
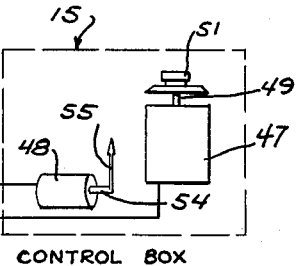
Fig. 2 is a somewhat diagrammatic view of the operating mechanism within the plumb-bob and control box of the apparatus.
Figure 3:
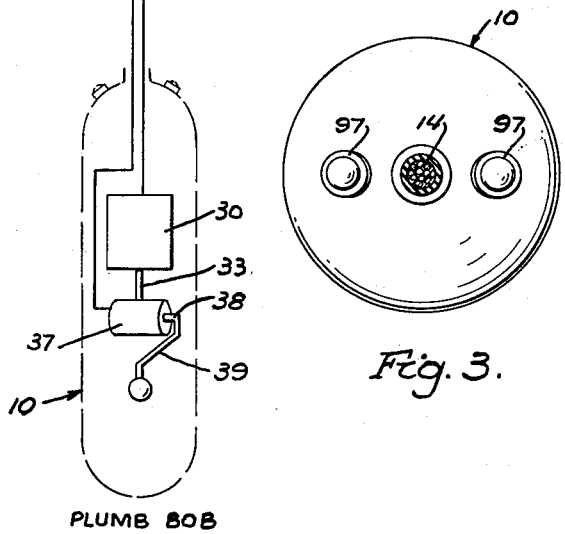
Fig. 3 is a top view of the plumb-bob.

The apparatus of this invention generally includes a plumb-bob 10 adapted to be lowered into a hollow piling 11 by means of a cable 12 from a tripod 13 positioned on the ground over the piling to be surveyed. An electric cable 14 connects the mechanism within the plumb-bob 10 with the mechanism within a control box 15. The mechanism within plumb-bob 10 and control box 15 comprises a standard Selsyn generator-motor system, Selsyn systems of this type being generally described in the article entitled "Selsyn Design and Application" by T. C. Johnson in Trans. AIEE, volume 64, page 703.

The plumb-bob is preferably fashioned as a housing formed of two cylindrical half sections 16 and 17, one forming the top half of the plumb-bob and the other forming the bottom half. The lower housing section 17 is provided with a bumper 18 at its lower closed end and with a circumferential collar 19 around its upper opened end so that the lower section 17 can be slipped upwardly into frictional engagement with the upper housing section 16. Within housing section 16 there is secured several circumferentially spaced brackets 20. Brackets 20 are secured to the side wall of section 16 and extend generally vertically of the plumb-bob. These brackets are provided with inwardly extending ears 21 and 22 at the upper and lower ends thereof. A supporting plate 23 is mounted on the ears 21 as by screws 24, and another supporting plate 25 is supported on the ears 22 by screws 26. The brackets 20 and plates 23 and 25 form a frame secured to the upper housing section 16 on which the operating mechanism within the plumb-bob is supported.

For the purposes of illustration the operating mechanism within the plumb-bob is shown as a Selsyn motor 30 suspended from plate 23 as by screws 31 and having a rotor 32, the shaft 33 of which extends vertically of the plumb-bob and is journalled adjacent its lower end within a bearing 34 supported on plate 25. The lower end of shaft 33 is threaded to receive a pair of nuts 35 between which is clamped a support bracket 36 which in turn supports a Selsyn transmitter 37. Transmitter 37, it will be observed, is arranged to rotate with shaft 33 in a plane perpendicular to the vertical axis of the plumb-bob. The rotor shaft 38 of transmitter 37 extends perpendicularly to shaft 33 and has fixedly supported thereon a pendulum 39 in the form of a bushing 40 having a depending arm 41 which carries a weight 42 at the lower end thereof. A set screw 43 fixes bushing 40 on shaft 38 so that shaft 33 is caused to rotated in correspondence with the swinging of pendulum 39. The extent to which pendulum 39 is permitted to swing is limited by a stop 44 in the form of a cup supported on a plate 45 which is in turn suspended from plate 25 by threaded rods 46.

As is shown in Fig. 1, plumb-bob 10 is arranged to be lowered into the driven hollow piling; and as the plumb-bob reaches a location where the piling is displaced from the vertical, the housing 16 engages the side wall of the piling so that the plumb-bob assumes a position tilted in correspondence with the inclination of the piling at the plumb-bob location. It has been found that a plumb-bob housing 16, 17 measuring about six inches in diameter and four feet in length is sufficiently large to house the necessary mechanism therein and to produce very accurate results.

Within the control box 15 there is arranged a selsyn generator 47 and a selsyn indicator 48. The rotor shaft 49 of generator 47 extends outwardly through the front face 50 of control box 15 and has a knob 51 secured thereto. Knob 51 has a scale 52 around the periphery thereof which cooperates with a fixed indicator 53 on the face 50 of control box 15 for designating the angular position of shaft 49. Selsyn indicator 48 has a rotor shaft 54 to the end of which is secured a pointer 55 which cooperates with a dial 56 on the face 50 of box 15 to designate the angular position of shaft 54.

Figure 4:
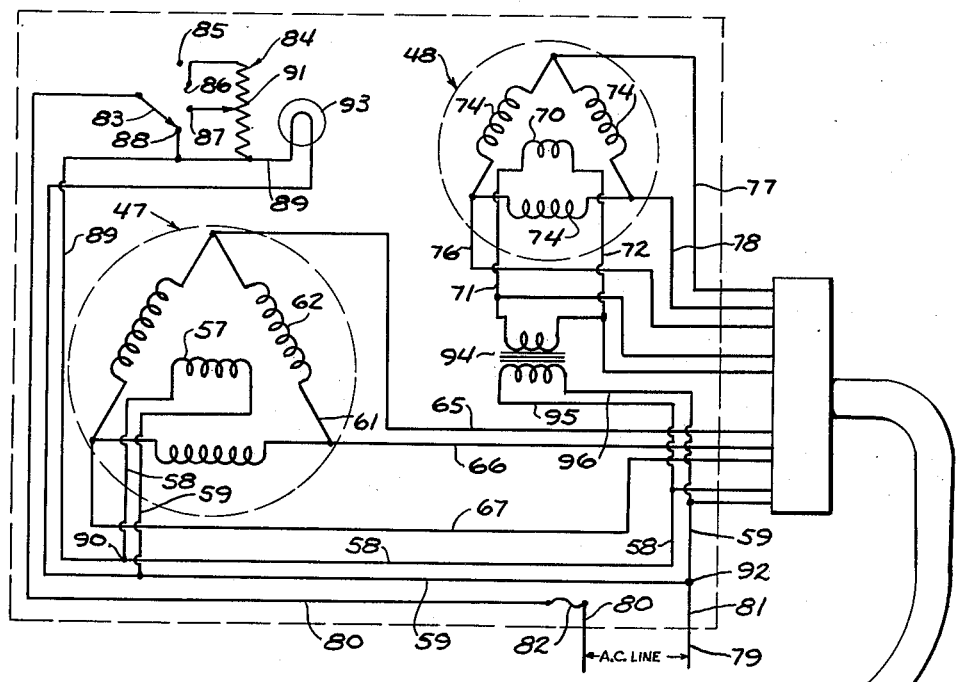
Fig. 4 is a wiring diagram of the apparatus.
Figure 4:
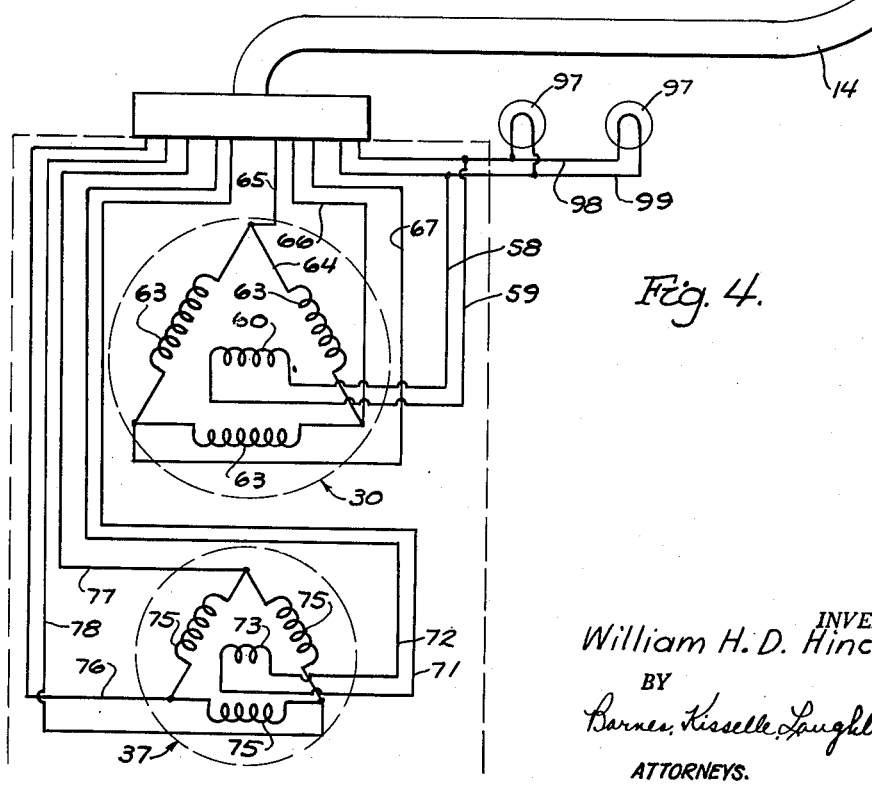
Figure 5:
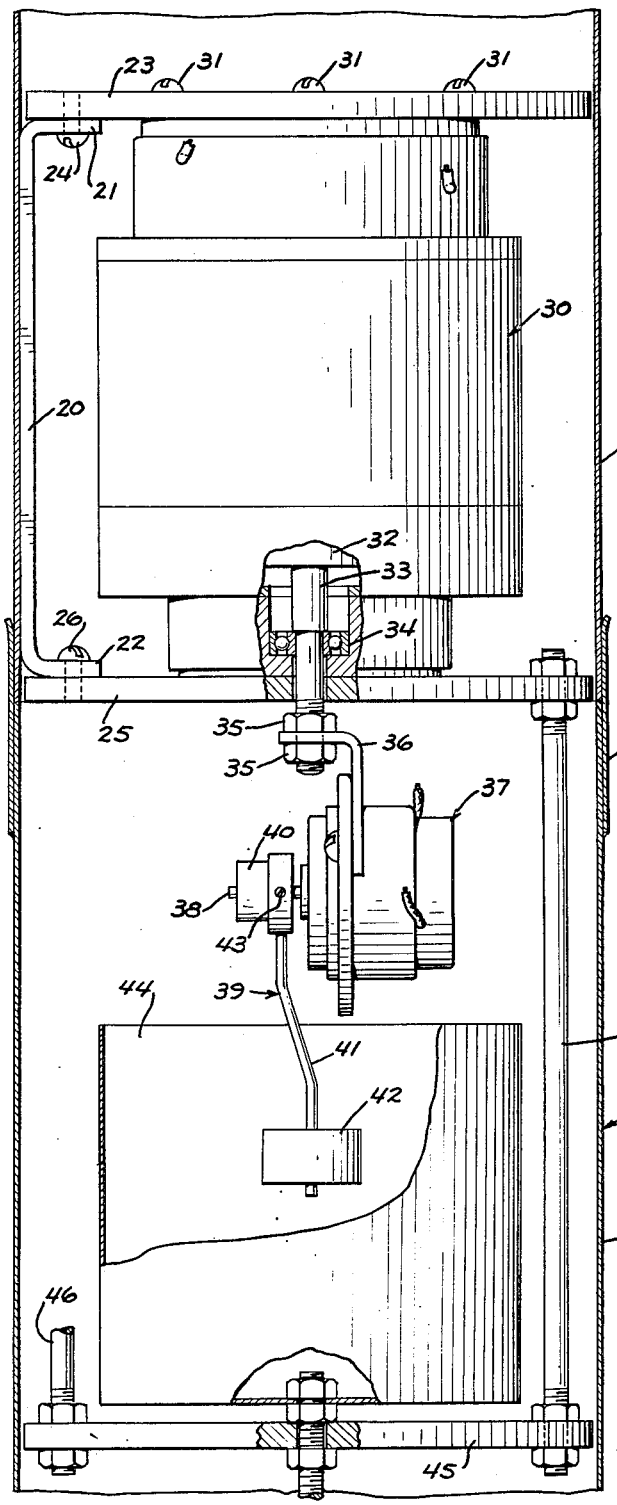
Fig. 5 is a vertical sectional view through the plumb-bob.
Figure 6:
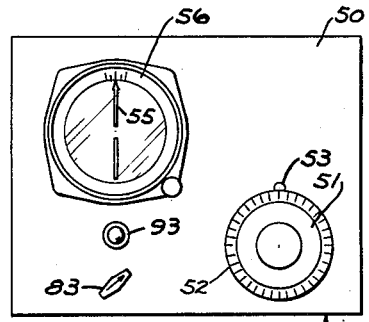
Fig. 6 is a view showing the face of the control box.
Figure 7:
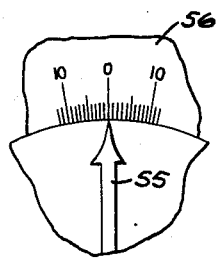
Fig. 7 is an enlarged fragmentary view of the dial and indicator on the face of the control box.

Referring now to the wiring diagram illustrated in Fig. 4, it will be observed that the generator 47 and indicator 48 in control box 15 are connected respectively with motor 30 and transmitter 37 in the plumb-bob 10 by means of a conventional selsyn generator-motor hookup. The generator 47 has a single phase primary winding 57 on its rotor which is connected by conductors 58 and 59 in cable 14 with the primary winding 60 on the rotor 32 of motor 30. The stator 61 of generator 47 has three secondary windings 62. Each of the windings 62 of generator 47 is connected with corresponding secondary windings 63 on the stator 64 of motor 30 by conductors 65, 66 and 67.

The primary winding 70 on the rotor of indicator 48 is connected by conductors 71 and 72 with the ends of the primary winding 73 on the rotor of the transmitter 37 in plumb-bob 10. Likewise, the three secondary windings 74 on the stator of indicator 48 are connected with three corresponding windings 75 on the stator of transmitter 37 by conductors 76, 77 and 78.

The apparatus is adapted to be energized by connection with a standard source of 110 volts A. C. Accordingly, control box 15 is provided with a socket 79 having a pair of conductors 80 and 81 for energizing the primary windings of the selsyn devices. Conductor 80 connects through a fuse 82 with the movable arm 83 of a power switch 84 having an "off" contact 85 and a series of "on" contacts 86, 87 and 88. Contact 88 is connected directly with a conductor 89 which connects with the conductor 58 of rotor 57 as at 90. Contacts 86 and 87 are connected with conductor 89 through a resistance 91. The other rotor conductor 59 connects with inlet conductor 81 as at 92. A pilot light 93 on the face of control box 15 is connected across conductors 89 and 59 so that, when switch 83 is turned to the "on" position, pilot light 93 is illuminated.

Rotor 70 of indicator 48 is energized through a transformer coil 94 which is connected across conductors 58 and 59 by conductors 95 and 96. Thus, when socket 79 is connected with a source of current and switch 84 is turned on, the rotor windings 57, 60, 70 and 73 are excited and the excitation of these windings induces, by transformer action, voltages in the secondary windings 62, 63, 74 and 75.

It will be observed that with this arrangement, whenever there is a lack of correspondence in position between the rotor 57 and the rotor 60, the voltages in the stator windings 62 and 63 will become unequal, thus causing a current to circulate in the secondary winding 63 which produces a torque on the rotor 60 causing the rotor 60 to rotate to a position in correspondence with the generator rotor 57. Likewise, when there is a lack of correspondence in position between rotors 73 and 70, current circulates in windings 74 of indicator 48 which causes the rotor 70 to rotate to a position in correspondence with the rotor 73. This operation is in accordance with the generally well-known principle of operation of selsyn motors.

In order to enable ascertaining the rotative position of plumb-bob 10 while it is suspended at a considerable depth within the piling, the plumb-bob housing 16, 17 is provided on the upper end thereof with a pair of orientation lights 97 which are connected by conductors 98 and 99 across conductors 58 and 59 so that, when switch 83 is turned on, the orientation lights 97 are illuminated.

When it is desired to survey a hollow piling which is driven into the ground to a considerable depth, plumb-bob 10 is lowered into the piling at predetermined increments of depth, for example, increments of ten feet. At each location, with the switch 84 turned on, the generator control knob 51 is rotated until the indicator needle 55 shows a maximum angular deflection. As the control knob 51 is rotated, rotor 57 rotates with it; and by reason of the servomechanism arrangement of generator 47 and motor 30, rotor 60 together with its shaft 33 is caused to rotate in correspondence with the rotation of generator knob 51. If, at the location being surveyed the piling 11 is inclined to the vertical, the plumb-bob 10, lying against the wall of the piling, is also inclined; and rotor shaft 33 is correspondingly inclined, since the axis of shaft 33 is aligned with the axis of the plumb-bob. When shaft 33 is rotated, transmitter 37, with its rotor shaft 38, is revolved in a plane perpendicular to shaft 33 and pendulum 39 swings under the influence of gravity to the vertical position on a plane perpendicular to the plane of inclination of the plumb-bob, thereby causing the shaft 38 to rotate an amount proportional to the extent to which pendulum 39 swings in maintaining its vertical position. For example, if the piling 11 at the location being surveyed is inclined to the vertical at an angle of 15°, then it is obvious that shaft 33 will also be inclined to the vertical at an angle of 15°. If shaft 33 is rotated through 360°, then pendulum 39 will swing with respect to the vertical 15°, first in one direction and then in the opposite direction under the influence of gravity in maintaining a vertical position. If the pendulum 39 swings through an angle of 15°, shaft 38 will be rotated through 15° and the pointer 55 will likewise rotate through an angle of 15° and designate this angle of rotation on scale 56. After the operator adjusts the generator knob 51 to a position where the indicator needle 55 shows a maximum angular deflection, the generator control knob 51 is rotated through 180° to obtain the maximum angular deflection in the opposite direction. The average of these two maximum readings is the angular deflection of the piling at the depth to which the plumb-bob is lowered. Since the depth to which the plumb-bob is lowered can be ascertained, such as by suitable markings on the cables 12 or 14, the angular deflection of the pile can be converted to linear displacement of the pile for that particular depth.

After the maximum angular deflection readings on dial 56 at one location are noted, the plumb-bob is lowered to a new depth, for instance, an increment of ten feet. Generator control knob 51 is again turned as above described and the two maximum angular deflection readings on dial 56 are noted at each location. Thus, the total displacement of the pile at any depth may be easily calculated; and by observing the orientation of lights 97 at the upper end of the plumb-bob, the direction in which the piling is inclined can be determined, since the zero mark on scale 52 of knob 51 bears a fixed relation to the position of lights 97.

Although the plumb-bob is described in connection with surveying hollow piling, the device is admirably suited for use in numerous other surveying applications. For example, the arrangement described herein may be employed for determining the course of travel of pipes in general that are driven into the ground, pipes for oil wells being illustrative. The device is also useful for surveying the elevation of horizontal pipes lying on the bottom of bays or oceans to determine their contour and for registering the inclination of relatively high self-supporting structures such as radio towers, chimneys, and smokestacks, etc.

I claim:

1. A device for surveying hollow piling comprising a plumb-bob adapted to be lowered into the piling being surveyed and engage the side wall of the piling such that the vertical axis of the plumb-bob is inclined to the vertical to the same extent as the vertical axis of the piling at the plumb-bob location, a selsyn motor in said plumb-bob, a shaft in said plumb-bob rotatable about an axis parallel to the vertical axis of the plumb-bob, said shaft having a driving connection with the rotor of said selsyn motor, a selsyn transmitter supported by said shaft for rotation therewith, said selsyn transmitter having a rotor shaft arranged for rotation about an axis perpendicular to the vertical axis of the plumb-bob, a pendulum fixed on said transmitter rotor shaft whereby, when said plumb-bob is inclined to the vertical, the rotor of said selsyn motor can be rotated to position the rotor shaft of said transmitter parallel to the plane of inclination of the plumb-bob and thereby permit the pendulum to pivot to a vertical position, a remotely positioned selsyn generator coupled with said selsyn motor, a manually movable indicator connected with the rotor of said selsyn generator for indicating the rotative movement of said last mentioned rotor and the corresponding rotative movement of the rotor of said selsyn motor, a second selsyn motor positioned remotely of said plumb-bob and coupled with said selsyn transmitter, said second mentioned selsyn motor having an indicator associated with the rotor thereof for indicating the rotative position of said last mentioned rotor in correspondence with the rotative position of said pendulum and the rotor shaft of said transmitter whereby, when the plumb-bob is disposed in a position such that its vertical axis is inclined to the vertical and said manually movable indicator of said selsyn generator is operated to rotate the rotor shaft of said first mentioned selsyn motor, said pendulum pivots from a position parallel to the vertical axis of the plumb-bob to a vertical position, and the angle through which the pendulum pivots is designated by said indicator of said second mentioned selsyn motor.

2. The combination set forth in claim 1 wherein said first mentioned shaft comprises the rotor shaft of said first mentioned selsyn motor.

3. The combination set forth in claim 1 wherein said plumb-bob comprises an elongate casing of cylindrical shape and including a pair of orientation lights mounted on the upper end of said casing.

References Cited in the file of this patent

UNITED STATES PATENTS

| Number | Name | Date |
|---|---|---|
| 1,551,393 | Hewlett et al. | Aug. 25, 1925 |
| 1,746,562 | Souvitza | Feb. 11, 1930 |
| 1,928,970 | Johnston | Oct. 3, 1933 |
| 2,429,620 | Harrington | Oct. 28, 1947 |
| 2,477,574 | Braddon | Aug. 2, 1949 |
| 2,497,594 | Fialkow | Feb. 14, 1950 |